(12) United States Patent
Canose et al.

(10) Patent No.: US 10,549,180 B2
(45) Date of Patent: Feb. 4, 2020

(54) SWIPE-DIRECTION GESTURE CONTROL FOR VIDEO GAMES USING GLASS INPUT DEVICES

(71) Applicant: Zynga Inc., San Francisco, CA (US)

(72) Inventors: Joseph Canose, San Francisco, CA (US); Priamos Georgiades, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 523 days.

(21) Appl. No.: 14/503,333

(22) Filed: Sep. 30, 2014

(65) Prior Publication Data

US 2015/0094127 A1  Apr. 2, 2015

Related U.S. Application Data

(60) Provisional application No. 61/884,863, filed on Sep. 30, 2013.

(51) Int. Cl.
*A63F 13/2145* (2014.01)

(52) U.S. Cl.
CPC ............................... *A63F 13/2145* (2014.09)

(58) Field of Classification Search
CPC .................................................. A63F 13/2145
See application file for complete search history.

(56) References Cited

U.S. PATENT DOCUMENTS

| 2006/0089198 | A1* | 4/2006 | Sawatani | A63F 13/10 463/33 |
| 2011/0039620 | A1* | 2/2011 | Hashimoto | A63F 13/10 463/36 |
| 2012/0046106 | A1* | 2/2012 | Ito | A63F 13/42 463/37 |
| 2013/0116046 | A1* | 5/2013 | Manton | A63F 13/00 463/31 |
| 2013/0130797 | A1* | 5/2013 | Stone | G06F 3/01 463/36 |

* cited by examiner

*Primary Examiner* — Kang Hu
*Assistant Examiner* — Thomas H Henry
(74) *Attorney, Agent, or Firm* — Penilla IP, APC

(57) ABSTRACT

Methods, systems, and computer programs are presented for handling a touch input to a game executed on a device. The method includes the operation of rendering the game on the device. The device includes a touch screen for receiving touch input from a user. The game renders a game object that is moveable in one or more directions within a scene of the game. A touch input is detected from the touch screen when the game object is selected for movement. The touch input is analyzed to determine if the touch input is a movement gesture with a swipe profile and a direction. When the touch input is a movement gesture, the game object is caused to move along the direction defined by the touch input.

20 Claims, 13 Drawing Sheets

SWIPE-DIRECTION GESTURE CONTROL FOR VIDEO GAMES USING GLASS INPUT DEVICES

CLAIM OF PRIORITY

This application claims priority under 35 U.S.C. 119(e) to U.S. Provisional Patent Application No. 61/884,863, filed Sep. 30, 2013, entitled "Swipe-Direction Gesture Control For Video Games Using Glass Input Devices," the disclosure of which is incorporated herein by reference in its entirety.

BACKGROUND

Field of the Invention

The present invention relates to methods for improving game interactions, and more particularly to manipulating game objects within a video.

Description of the Related Art

Online games allow players to provide input to the game using various input devices. The input devices provide controls and the users use these controls to manipulate game play by maneuvering the various game objects within the game. Online game providers and operators continually seek to provide new ways to provide controls and to improve the input devices in order to make it easy for the users to provide input and to manipulate the game play of the games. As online games are becoming popular, game developers, both newer and existing ones, are introducing new games or evolving existing games to interface with newer or varying control mechanisms for controlling input to the games causing unnecessary complications. It is, therefore, becoming increasingly harder for users to memorize the various controls and/or become familiar with the control mechanisms to manipulate game objects in the games, as these control mechanisms seem to largely vary from one game to the next.

It is, therefore, advantageous for the online game operators to seek a more simplified solution for providing control mechanisms to manipulate the game objects during game play so as to keep players interested in the game and enriching the players game experience, because increased playing times and satisfied players often means higher game revenues for the game operators.

It is in this context that embodiments arise.

SUMMARY

Several embodiments are disclosed for providing a control tool that allows users to manipulate game play of a video game by providing touch input on a touch screen. A video game is rendered for game play on a display device. The display device includes a control-screen with a touch screen interface. Touch input is detected at the touch screen interface. The touch input may be provided as a movement gesture or a tap gesture on the touch screen interface. The touch input is associated with a swipe profile that identifies a location and direction of the touch input. The touch input is used to manipulate a game object within the game scene of the video game. The manipulation of the game object includes movement of the game object, interaction with other game objects (both destructible and indestructible game objects), and in some embodiments, manipulation of momentum, etc. Input using the touch-screen is simple and does not require difficult controls memorization, making this an effective input tool. It should be appreciated that the present embodiments can be implemented in numerous ways, such as a method, an apparatus, a system, a device, or a computer program on a computer readable medium. Several embodiments are described below.

In one embodiment, a method is provided for handling a user input to a game, such as a video game, executing on a device, during game play. The method includes the operation of rendering the game on the device for game play. The device includes a control-screen with a touch screen interface for receiving touch input during game play. Touch input is detected at the touch screen interface of the control-screen when the game object is selected for movement. In response to the detection, the touch input is analyzed to determine if the touch input is a movement gesture and, if so, determining swipe profile and a direction. The game object of the video game is manipulated to cause the game object to commence movement along the direction defined by the touch input.

In another embodiment, a method is provided for handling a user input to a game executing on a device, during game play. The method includes the operation of rendering the game on the device for game play. The device includes a control-screen with a touch screen interface for receiving user input during game play. A first touch input is detected at the touch screen interface of the control-screen when the game object is selected for movement. In response to the detection, the first touch input is analyzed to determine the type of gesture and input profile of the first touch input. The game object of the game is manipulated to correlate with the first touch input. Upon manipulation of the game object in accordance with the first touch input, a second touch input is detected at the touch screen interface of the control-screen. The detection includes identifying input profile of the second touch input, which is different from the input profile of the first touch input. The manipulation of the game object is refined to correlate with the second touch input.

In yet another embodiment, a computer program embedded in a non-transitory computer-readable medium is disclosed. The computer program is used to perform a method for handling a user input to a game executed on a device. The computer program includes program instructions for rendering the game on the device for game play. The device includes a control-screen with a touch screen interface for receiving touch input during game play. The computer program also includes program instructions for detecting touch input at the touch screen interface of the control-screen when the game object is selected for movement; program instructions for analyzing the touch input to determine if the touch input is a movement gesture and, if so, determining swipe profile and a direction; and program instructions to manipulate the game object of the video game to cause the game object to commence movement along the direction defined by the touch input.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, computer programs, and apparatus for manipulating a game object during game play of an online video game based on a touch input received on a control-screen of a client device. The touch input may be in the form of a simple movement gesture or a tap gesture on the control-screen. The touch input includes a swipe/tap profile and direction. The touch screen interface identifies the location and direction of the touch input on the control-screen and relays this information to a game manager. A control tool, such as game play manipulator, within the game manager interprets the information provided in the touch input and manipulates the game object of the video game in accordance with the interpreted information. The manipulation may include causing the game object to commence movement, continue movement along a direction defined by the touch input or cease movement. In some embodiments, the game play manipulator also determines a magnitude of displacement defined by the touch input and manipulates the movement of the game object and/or the momentum of the game object in accordance to the magnitude of displacement. The touch input provided on the control-screen is thus used to control the game object thereby manipulating the game play of the video game. It will be apparent that the present embodiments may be practiced without some or all of these specific details. In other instances, well known process operations have not been described in detail in order not to unnecessarily obscure the present embodiments.

Figure 1:
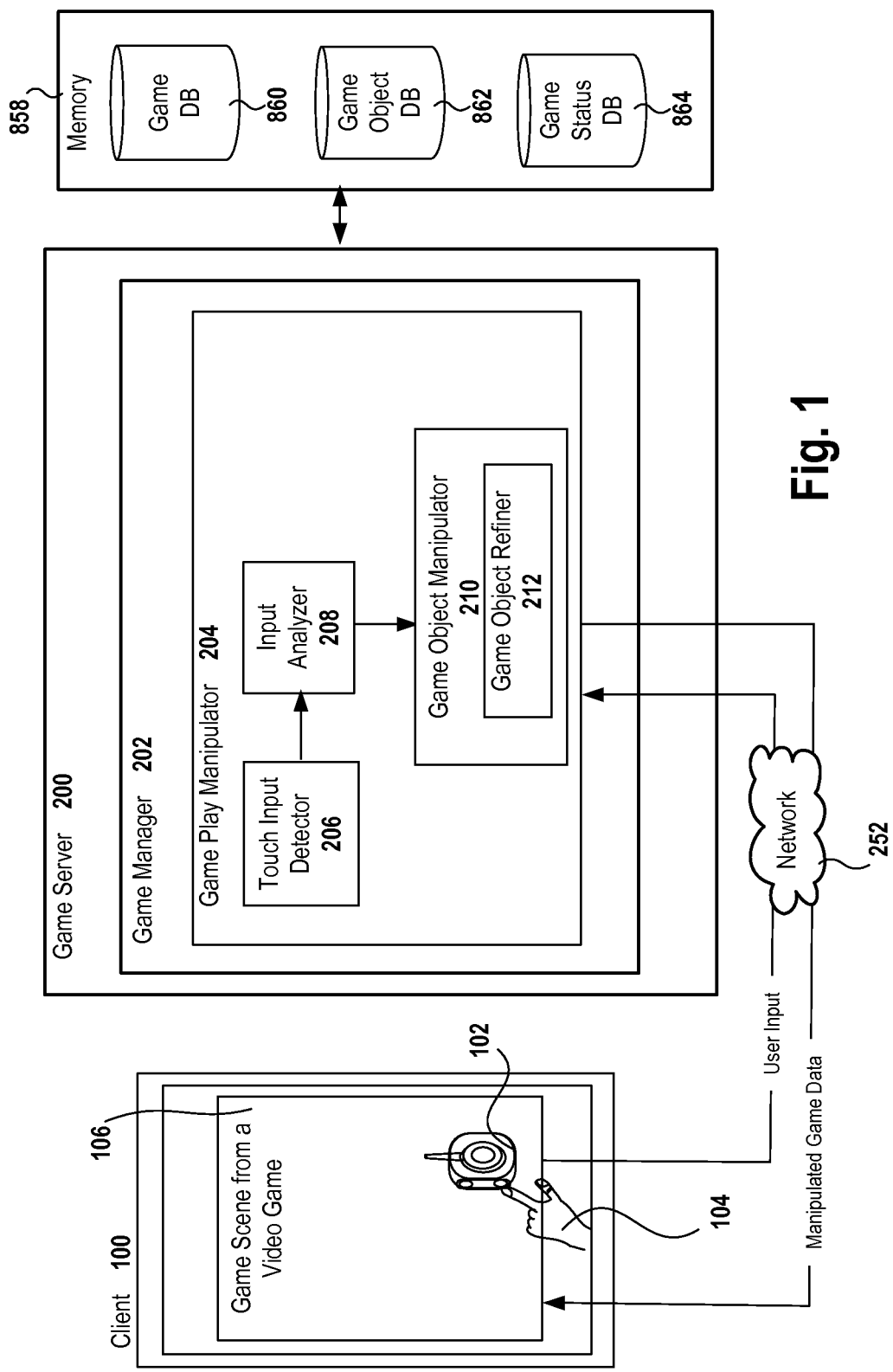
FIG. 1 shows a simplified block diagram of a game play manipulator used to manipulate a game object during game play of a video game, in accordance with one embodiment of the invention.

FIG. 1 illustrates a simplified block diagram of a system, in one embodiment, providing a control tool for manipulating a game object during game play of a video game (or simply a "game"). A client device 100 is used to initiate a request, execute a selected game and render game play of the game, provide input to manipulate a game object during game play of the game and to request and receive data related to the game, over a network 252, such as the Internet. The client device 100 includes a display device 106 for rendering the game play of the game. The display device 106 may be a glass input device with a control-screen and a touch screen interface. The control-screen is used to receive touch input 104 and to transmit the touch input 104 to a game server 200 over the network 252. The touch input at the control-screen is used to select a video game and a game object for manipulating during game play. The control-screen is configured to render the game play of the selected video game. The game play may include game scene and at least the user-selected game object of the video game. The user-selected game object 102 is rendered as an icon associated with the game, such as a battle tank in a war game or an avatar of a person in a social game or an icon of a car in a racing game, etc. The client device 100 may be any type of computing device that runs client-side computer programs, such as browser software or any other client-side programs that can interface with server-side programs executing on the game server 200, to exchange data and other game-related information over the network 252. Touch input at the client device during game play is used to manipulate the game object 102 of the video game once the video game is initiated using the browser.

The server 200 is a game server that hosts a plurality of games stored in a game database 860 within memory 858. Based on the request from the client device 100, a game manager 202 within the game server 200 detects the selection, interacts with the game database 860 within memory 858 to retrieve the necessary program instructions for executing the video game on the server 200. In some embodiments, some portions of the video game are executed on the server 200 and the other portions executed on the client 100. The execution of the video game causes the video game to be rendered on the display device 106 of the client 100, for game play.

In one embodiment, as part of an initializing routine of the video game, the game manager 202, depending on the video game selected, may provide a plurality of game objects appropriate for the game, for user selection. The game objects are retrieved from a game object database 862 and presented for user selection. Alternately, the game manager 202 may select a specific game object from the game object database 862 and just assign the specific game object to the user.

During game play, a game play manipulator 204 receives touch input 104 from the client device 100 and processes the touch input to manipulate the game object within the game. The game play manipulator (or simply 'manipulator') 204 includes a plurality of modules that are used to manipulate the game object 102 and, hence, the game play. In one embodiment, the manipulator 204 includes a touch input detector (or simply a 'detector') 206, an input analyzer (or simply an 'analyzer') 208, and a game object manipulator (or simply an 'object manipulator') 210 with a game object refiner (or simply a 'refiner') 212.

During game play of the selected video game, touch input detected at the control-screen of the display device 106 rendering the video game, is transmitted to the game manager 202 of the selected video game executing on the server 200. The detector module 206 within the game play manipulator 204 of the game manager receives the transmitted touch input and validates the touch input. The validation may include determining the type of client device from where the touch input is received, validating the client device type, determining and validating user identification, and determining the video game for which the touch input is received. Information from the detector 206 is shared with the analyzer 208.

The analyzer 208 analyzes the input profile of the touch input to determine the different characteristics of touch input provided at the client device. The touch input may be in the form of a finger gesture provided at the touch screen interface of the display device and the characteristics may include the type of finger gesture, directional aspect associated with the input, start location, end location of the input on the touch screen interface, etc. The type of input may include a movement gesture or a tap gesture, etc. The above list of types is exemplary and should not be considered limiting. The movement gesture is associated with a directional displacement aspect and the tap gesture is associated with a location aspect. The location of the touch input provided on the touch screen interface correlates to a terrain or game scene, in some embodiments. In some embodiments, the location of the touch input may relate to one or more game objects within the terrain/game scene of the video game that is present at the time the touch input was received. For example, the analyzer 208 may determine that the touch input is a tap gesture that was provided on a game object of the user, on a second game object, at a specific portion of the game scene that does not have any game objects, etc. In this example, the analyzer 208 will determine the location of the touch input on the touch screen interface and use it to manipulate the game object of the game. Likewise, the analyzer 208 may determine that the touch input includes a movement gesture having a swipe profile with a start location and an end location within the game scene rendered at the display device, etc. In this case, the analyzer 208 computes the magnitude of displacement from the start location and end location of the movement gesture. The magnitude of displacement along with the directional aspect of the gesture, such as a forward swipe, a backward swipe, a horizontal swipe to the left, a horizontal swipe to the right, etc., is used to manipulate the game object within the game scene. In one embodiment, the magnitude of displacement computed from swipe profile information provided in the touch input, is compared against a predefined threshold value to determine if the game object needs to be manipulated or if the touch input needs to be ignored.

Figure 2A:
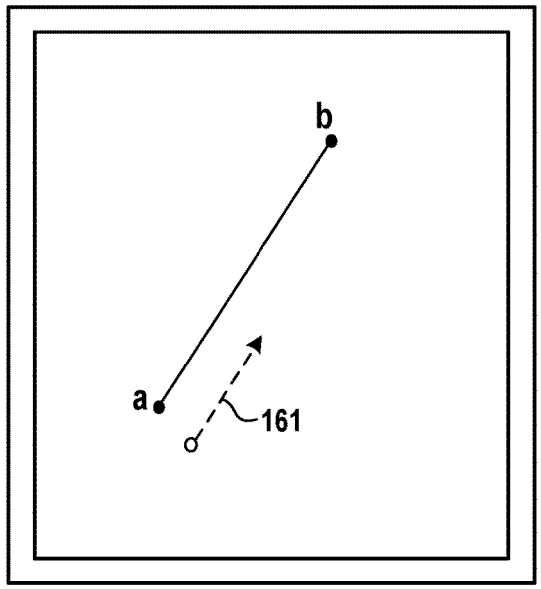
FIGS. 2A-2D illustrate exemplary views of swipe profile provided in a touch input that is used to manipulate the game object, in accordance to some embodiments of the invention.
Figure 2B:
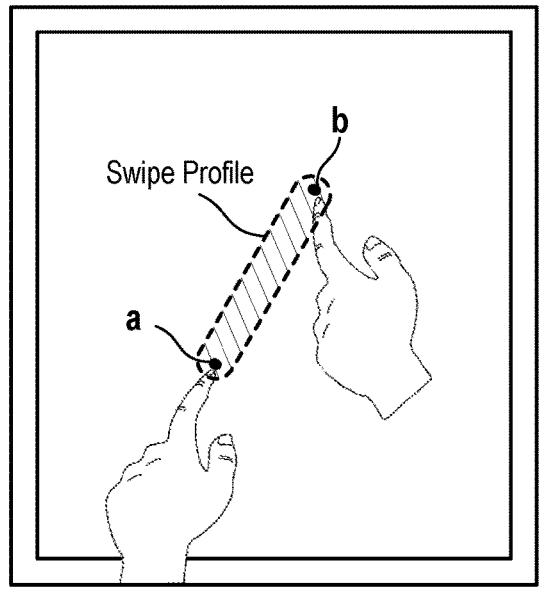
Figure 2C:
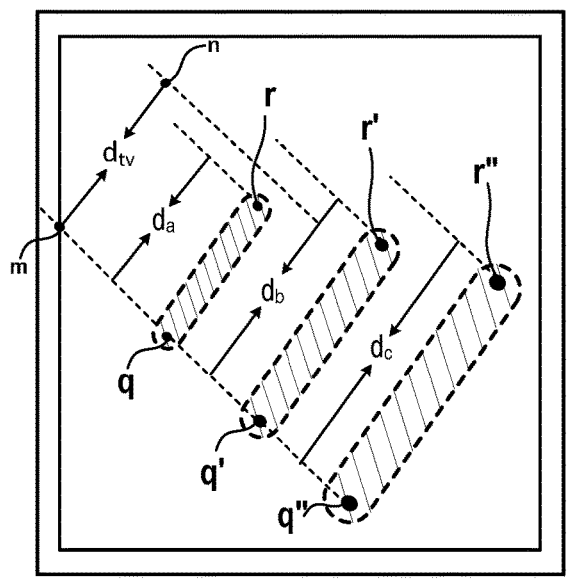
Figure 2D:
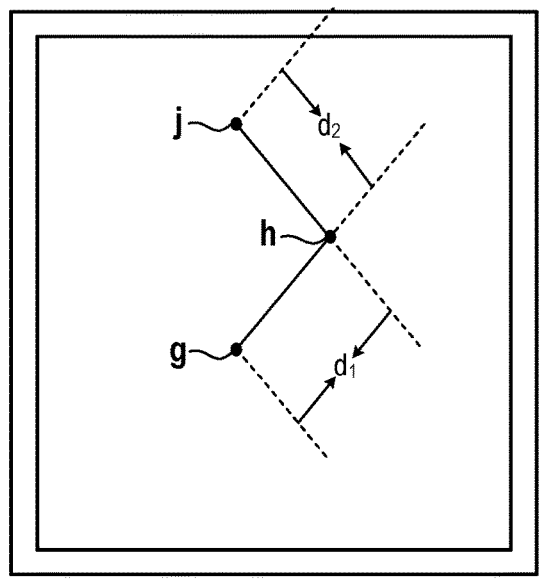

FIGS. 2A-2D illustrate the various aspects of the swipe profile used in manipulating the game object, in some embodiments of the invention. FIG. 2A illustrates the characteristics of touch input provided within the swipe profile. The swipe profile captured by the touch screen interface includes a start location 'a', an end location 'b', and a direction defined by arrow 161. The swipe profile is captured by detecting the direction and location of a user's finger as it moves on the touch screen, as illustrated in FIG. 2B. The analyzer 208 computes the magnitude of displacement as the distance between the start and end locations. The computed magnitude of displacement is compared against a predefined threshold value to determine if the magnitude of displacement is large enough to consider manipulation of the game object. As illustrated in FIG. 2C, a predefined threshold value may be defined as the distance '$d_{tv}$' between locations 'm' and 'n'. When a touch input defined by start location q and end location r is detected at the touch screen, the analyzer 208 may determine the magnitude of displacement by computing the distance '$d_a$' between q and r. Upon determining the q-r distance, the displacement magnitude defined by distance '$d_a$' is compared against the predefined threshold value (i.e., distance '$d_{tv}$'). If the q-r distance is less than the predefined threshold value, then the touch input is ignored. If however, the magnitude of displacement of the touch input is equal or greater than the predefined threshold value, (for e.g., the distance '$d_b$' between locations q' and r' or distance '$d_c$' between locations q" and r"), the touch input is used for manipulating the game object. The direction of the various touch inputs illustrated in FIG. 2C is represented in a single direction. FIG. 2D illustrates an alternate embodiment where the touch input identifies more than one direction. In this embodiment, the magnitude of displacement of each directional segment is compared against the threshold value and the game object manipulated based on the comparison. For example, the distance of segment represented by 'g' and 'h' as well as the segment represented by 'h' and 'I' are each compared against the predefined threshold value and when the distance of the corresponding segment equals or exceeds the threshold value, the touch input of the corresponding segment(s) is used in the manipulation of the game object.

Information from the analyzer 208 is provided to the object manipulator 210 for further processing. The object manipulator 210 uses the information from the analyzer to manipulate the game object and to transmit the manipulated game data to the client device 100 for rendering on the display device 106, in response to the touch input 104.

When the touch input includes a movement gesture in the forward direction, the object manipulator 210 may manipulate the game object of the user providing the touch input, to move forward. In one embodiment, the object manipulator 210 may associate a certain momentum to the game object based on the magnitude of the forward swipe. In one embodiment, depending on the state of the game object, the object manipulator may change the state of the game object based on the forward swipe. For example, when the game object is at rest and the touch input is a forward swipe, the object manipulator 210 may change the state of the game object from rest to motion in a forward direction and associate a predefined momentum. It should be noted that the state of the game object changes when the magnitude of displacement is above a threshold value, as explained with respect to FIGS. 2A-2D. In one embodiment, the game object that is already moving in a particular direction with a specific momentum may be allowed to move in the same direction but the momentum may be increased by a predefined amount by the object manipulator 210, when the directional aspect of the touch input is the same as the direction that the game object is moving. In another embodiment, the object manipulator may allow the game object moving in a forward direction at a specific momentum to continue moving in the same direction at the same momentum. In this embodiment, the original direction and the momentum are maintained.

In another embodiment, when the game object is moving in a sideward direction or in a backward direction, the object manipulator 210 may, in response to the forward swipe, manipulate the game object to change the direction of movement to correlate with the direction defined by the forward swipe while continuing to maintain the same momentum. In this embodiment, the game object is manipulated to cease moving in the first direction and commence moving along the direction defined by the forward swipe. In one embodiment, when the direction of the game object is changed by the touch input, the momentum may be reduced by a predefined factor. In another embodiment, when the game object is against an indestructible object, such as a hill, a stone, tree, etc., the forward swipe may be interpreted by the object manipulator 210 to maneuver the game object around the indestructible object and continue moving forward along the direction of the swipe. Thus, depending on the state, location, direction of movement, momentum of the game object, the object manipulator 210 may manipulate the direction and momentum of the game object to reflect the touch input.

Along similar lines, the object manipulator may change the state of the game object from moving to rest depending on the input profile of the touch input. For example, when the touch input is a tap gesture on the game object moving in a particular direction, the object manipulator may manipulate the game object to cause the game object to come to a stop. A tap gesture on a different game object may cause the game object to interact with the different game object and the nature of the interaction may depend on the game selected for game play. For example, in a war game, the interaction may be an attack. As a result, the game object may be manipulated to fire/deploy a missile at the second game object. In a socially collaborative game, such as building game (e.g., "Farmville"®) the interaction may be a collaborative interaction. As a result, the interaction may include manipulating the game object to move toward the second game object to exchange greetings, goods, tools, gifts, services, etc. In one embodiment, as part of the interaction, the game object is manipulated to face the second game object to either deploy the missile or to exchange greetings/goods/services, etc.

Figure 3A:
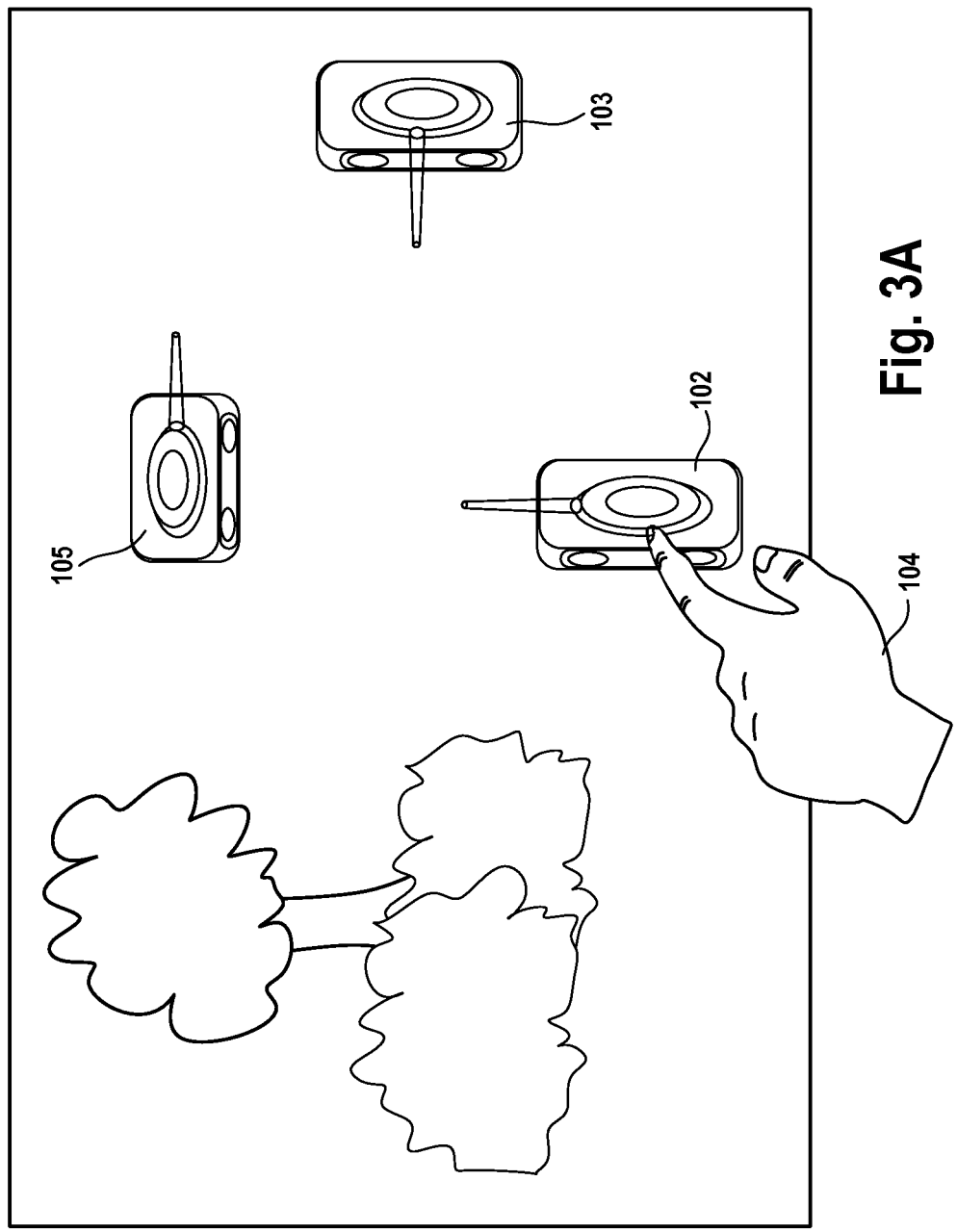
FIGS. 3A-3F illustrate exemplary control-screen of a display device used to render game scenes of a video game and to receive different types of touch input for controlling the game play of the video game, in accordance with some embodiments of the invention.

The various finger gestures provided at the touch screen interface of the control-screen on the client and its effect on the game play of a particular video game, are discussed in detail with reference to FIGS. 3A-3F. Additionally FIGS. 3G-3H illustrate the result of finger gestures provided at the touch screen interface FIG. 3A illustrates an exemplary game scene of a selected video game rendered on the display device of the client during game play, in one embodiment. The selected video game is a war game and the game scene shows a terrain of the war game with a plurality of game objects and obstacles. The video game may be any other type of game and the game objects selected for manipulation are appropriate for the selected game, as will be explain in detail with reference to FIGS. 3G and 3H. The game objects, in this embodiment, are illustrated as army tanks, 102, 103, 105, etc., with the game object 102 being selected by a user for use in the game play. Game objects 103 and/or 105 may be associated with other users in a multi-player game or may be other objects provided as obstacles/targets within the game. A single type of game object is shown in the game scene for illustrative purposes only. The embodiments are not restricted to the single type of game object but may include other types of game objects depending on the selected video game. In the war game, the other types of objects may include planes, soldiers with guns, army trucks, etc. It should be noted that the war video game is exemplary and used for illustrating how the object manipulator 210 is used to interpret the touch input provided on the touch screen interface of the display device. The interpretation of the touch input by the object manipulator may be extended to other types of video games for which touch input is provided using the touch screen interface.

Touch input 104 provided at the control-screen of the display device as part of game play identifies the input characteristics, such as start location, end location, and direction of the touch input. The input characteristics of the touch input will determine which portion of the game scene needs to be manipulated. In FIG. 3A, a touch input 104 is provided on the game object 102. The touch input may be a tap or a tap-and-hold gesture. In one embodiment, at the beginning of the game play or when the game object is at rest, the gesture would be interpreted by the object manipulator to activate the game object for receiving additional touch input. In another embodiment, if the game object was moving, the gesture is used to manipulate the game object to stop moving. In yet another embodiment, when the game object 102 is at rest, the touch input provided on the game object would result in the game object continuing to be at rest but is activated for receiving additional touch input.

Figure 3B:
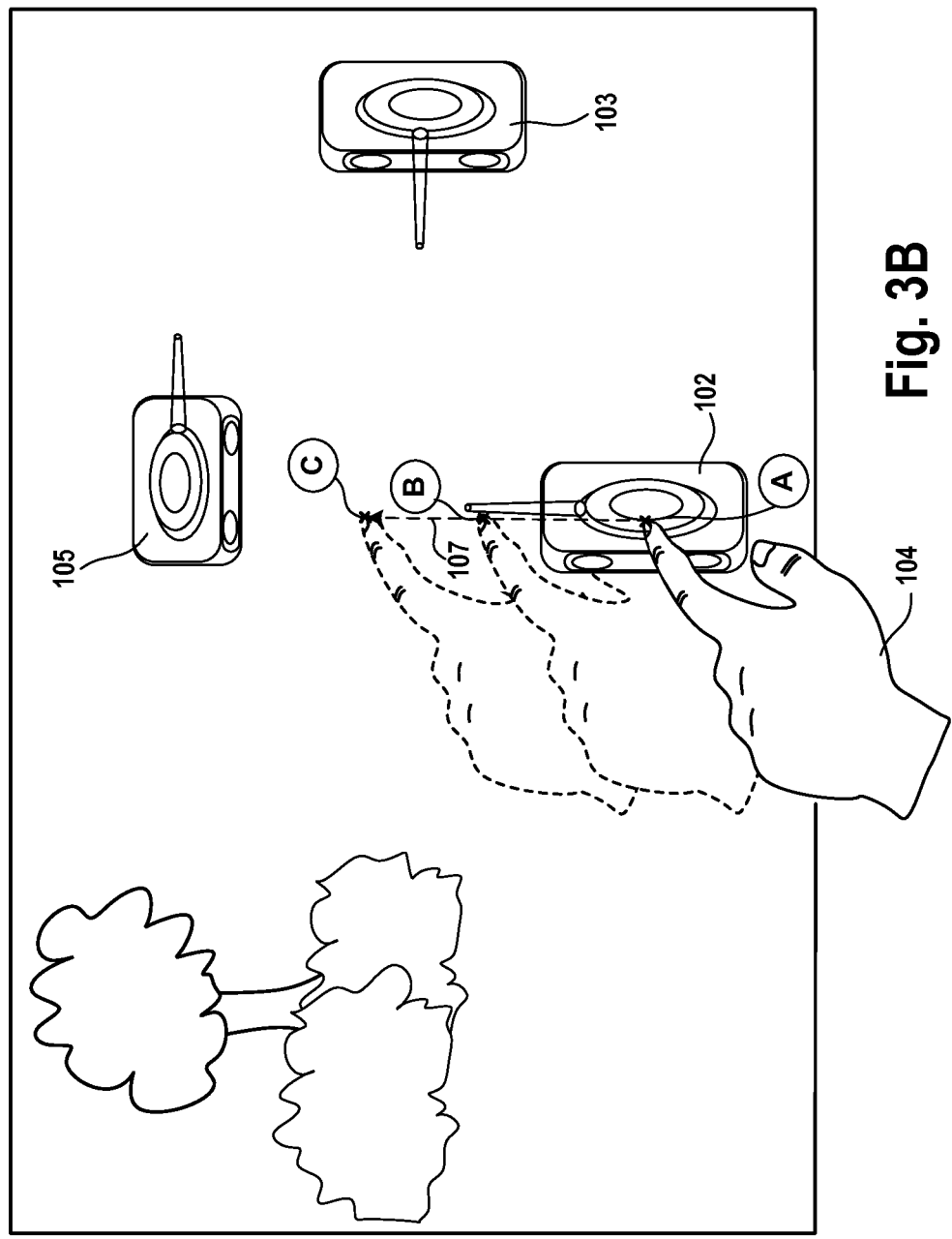

FIG. 3B illustrates an exemplary touch input that includes movement gesture with directional aspect to provide the direction the user wishes the game object to move within the game scene. In this embodiment, the touch input is a forward swipe on the control-screen from location 'A' to location 'C'. Based on the touch input detected by the touch screen interface, the game object 102 of the user providing the touch input, is manipulated to move forward in a vertical direction. In one embodiment, the flicking motion of the forward swipe determines the momentum that is to be provided to the game object during the move. The game object, in one embodiment, may continue to move in the direction provided by the touch input till a subsequent touch input is received or till the game object encounters an obstacle. When the game object encounters an obstacle, the object manipulator 210 of FIG. 1 would manipulate the game object to bounce off the obstacle and/or maneuver/steer around the obstacle till the game object is able to find a path to move in the direction set by the touch input. The obstacle, in one embodiment, may be an indestructible object, such as a rock, a wall, one or more trees, water, a waterfall, a mountain, a hill, etc., that is provided as a challenge or a target to overcome in the game.

Figure 3C:
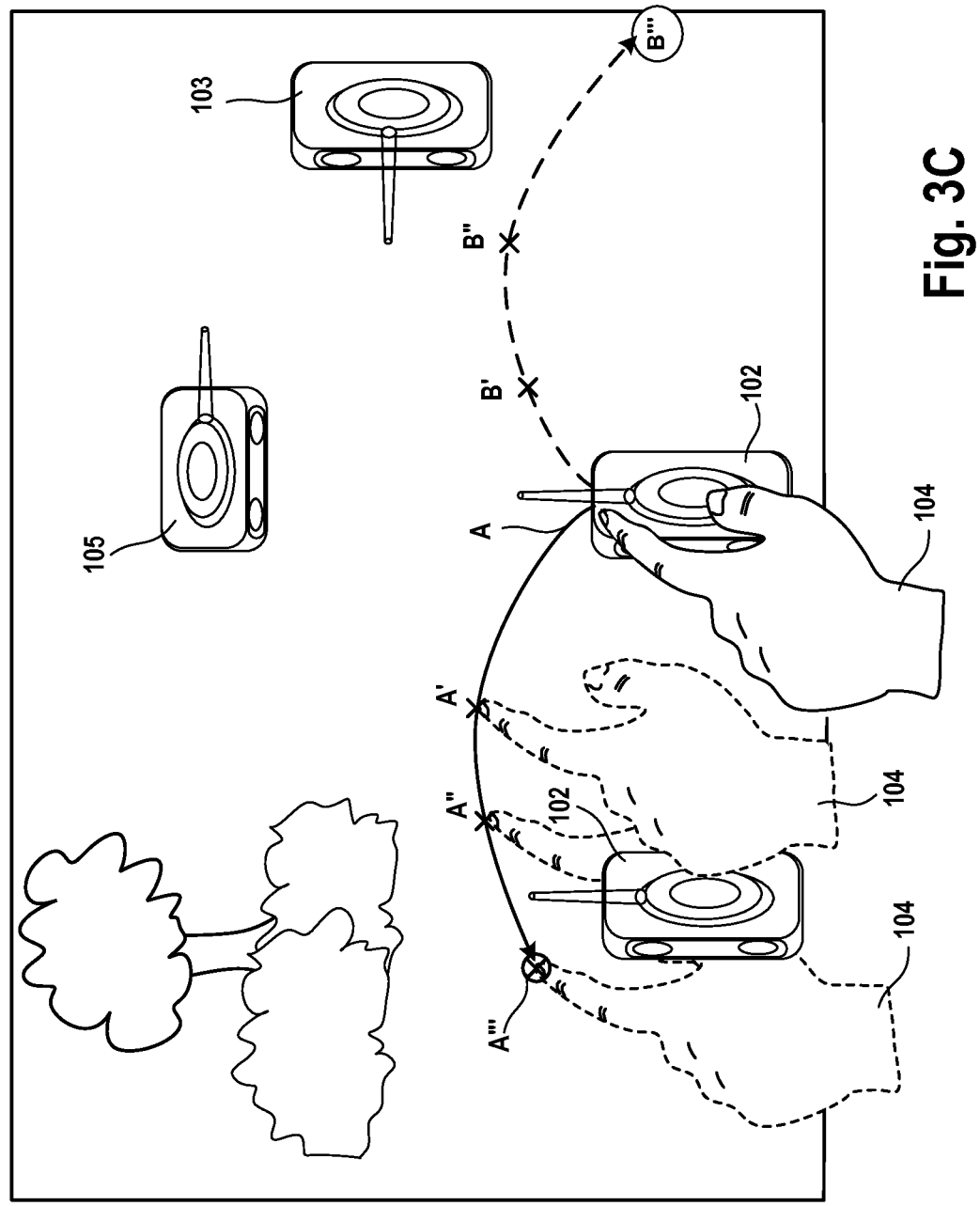

FIG. 3C illustrates touch input that is provided as a sweeping finger gesture. In one embodiment, once the game object is activated for movement, the touch input (i.e., sweeping finger gesture) for moving the game object may be provided anywhere on the control-screen and does not have to start at the location where the game object is in the game scene. The touch input is interpreted to determine the type (movement gesture or tap gesture), location and direction and the game object manipulated accordingly. In the case of sweeping finger gesture illustrated in FIG. 3C, the game object is manipulated to trace the direction of the gesture. In this embodiment, the touch input takes a trajectory path to the left represented by location points, A, A', A", and A''', and the game object 102 is manipulated to move from point A to point A''' following the same trajectory path. Additionally, the game object may be moved with a predefined momentum or with a momentum defined by the touch input Likewise, the touch input may also trace a trajectory path to the right represented by points, A, B', B" and B''', and the game object 102 is manipulated to move from point A to point B'''. The sweeping finger gesture may be provided in any direction the user wishes to move the game object and the object manipulator detects the direction and manipulates the game object to move in the specific direction. In one embodiment, an indicator on the game object may be used to provide visual indication of manipulation of the game object in response to the touch input. In the embodiments where the game object is provided momentum, the momentum accorded to the game object may depend on the state of the game object, the directional and other characteristics of the touch input.

Figure 3D:
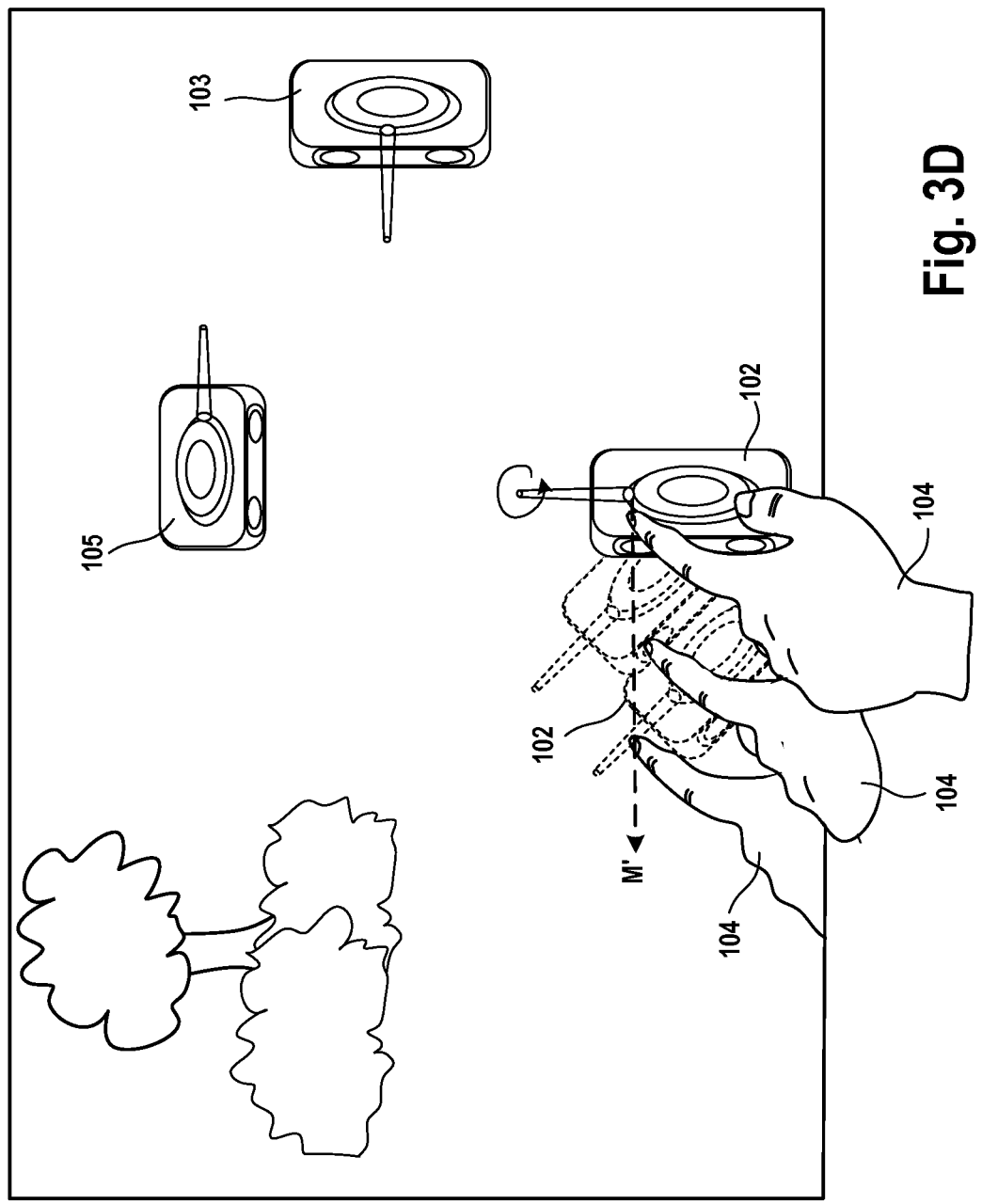

FIG. 3D illustrates yet another type of touch input, in one embodiment. The touch input, in this embodiment, is used to pivot the game object 102 around in a direction defined by the touch input. For example, in one embodiment, when the touch input is a horizontal swiping gesture to the left side, the game object may be manipulated to rotate to the left.

Similarly, when the touch input is a horizontal swiping gesture to the right side, the game object may pivot to the right. In another embodiment (not shown), the touch input may be a touch-and-hold gesture provided on the game object. As with the horizontal swiping, the touch input, in this embodiment, may be interpreted to pivot the game object around to change the direction the game object is facing. The direction for pivoting may be determined by the direction provided by the touch-and-hold gesture or may be random. During the hold, the touch screen interface of the control-screen may detect turning of the finger in a clockwise or counter-clockwise direction. This detection is registered by the object manipulator and the game object manipulated to pivot and turn in the direction of the finger gesture movement detected on the control-screen. When the touch-and-hold gesture is removed by the release of the finger hold on the control-screen, the rotation or pivoting of the game object is stopped.

The forward swiping of finger or forward flicking provided in the touch input may be used to move the game object in a forward direction that is anywhere between 0° and 180° with the directionally forward angle being at 90°. The maneuvering of the game object is facilitated in different directions by the detection and interpretation of simple flick movements in specific directions provided in the touch input on the control-screen of the client device. In one embodiment, when the client device is a tablet computing device or any other computing device with a touch screen interface in the display device, the user flick may be provided from the bottom of the tablet to the top of the tablet or from a location on the tablet that is in close proximity to the user away from the user. By allowing the user to simply flick/swipe the screen (i.e., slide of a user finger across the screen), the user is able to manipulate the direction and/or state of the game object as well as, in some embodiments, influence the momentum of the game object as the game object moves across the screen with each touch input. It should be noted that each user flick/user swipe would result in the moving of the game object forward in the direction of the user flick/user swipe.

Figure 3E:
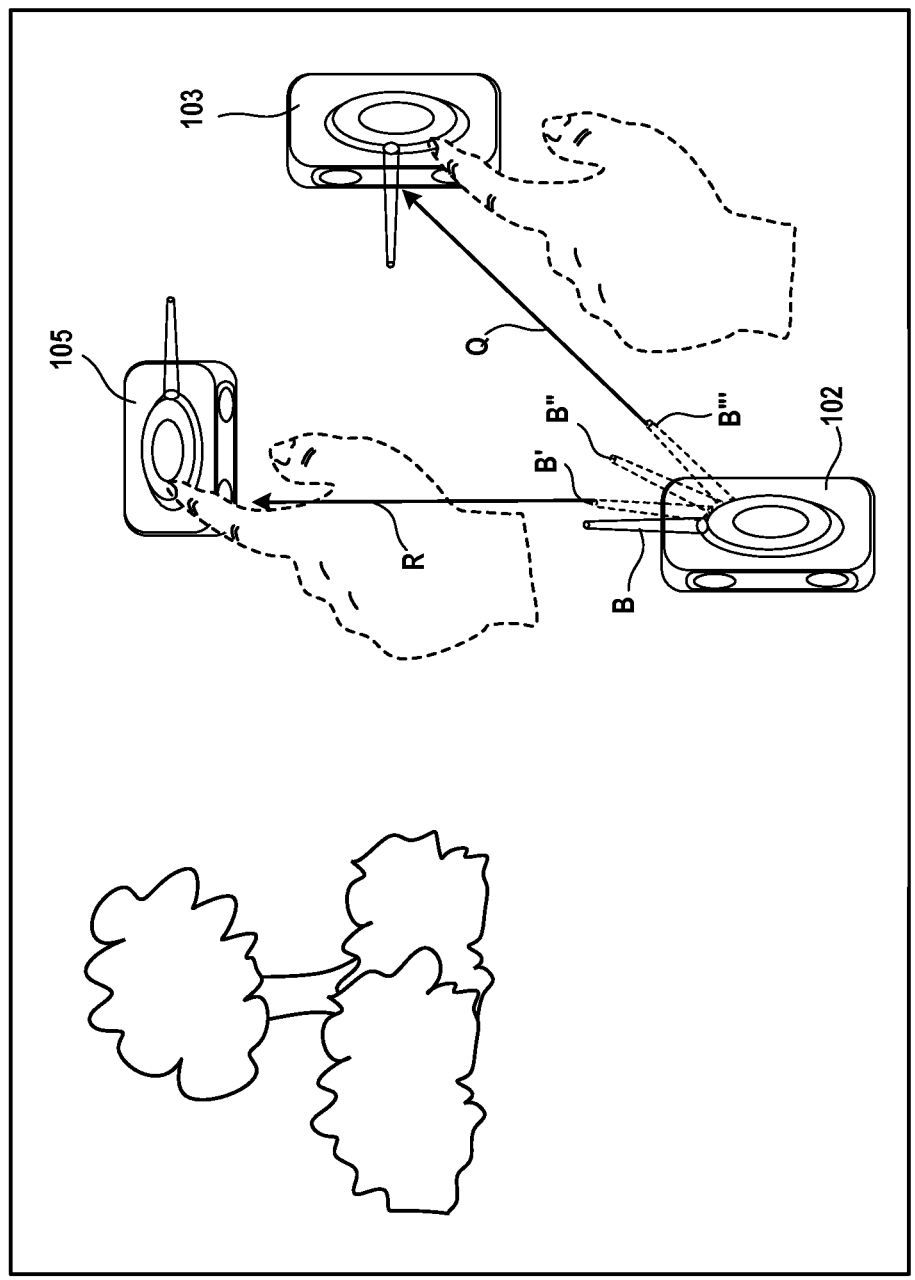

FIG. 3E illustrates an effect of detecting a touch input on a second game object, at the game object of the user, in one embodiment. During game play, a user may provide touch input by using a tap gesture on a second or third game objects, 103 or 105, belonging to other players, as shown in FIG. 3E, other game objects provided in the game scene by the video game, or icons of other players. The other game objects may include missiles or obstacles deployed by different players. The other game objects may be destructible objects, icons, or challenges generated by the game for players to conquer. The tap gesture is analyzed to determine the tap profile and the object of interest. Information from the tap gesture is used to manipulate the game object. For example, in response to the tap gesture on the second, third or other game objects, the object manipulator 210 manipulates the game object 102 of the user to interact with the corresponding selected game object. Depending on the type of video game being played, the interaction may take different forms. For example, in a war game, the interaction may include the user's game object 102 deploying a missile at the selected game object that is present in the game scene when the tap gesture was received. FIG. 3E illustrates a missile being deployed at the second, third game objects, as shown by arrows 'Q' and 'R,' in response to the user tapping on the respective game objects 103, 105. In some embodiments, the second, third and/or other game objects may be moving objects and the user tapping will result in the manipulation of the game object 102 to track the movement of the second, third or other game objects and interact appropriately. In a socially collaborative video game, the tapping on the second, third or other game objects may cause the game object to exchange greeting, goods, gifts, services, etc., if the selected game object is an icon of a person.

Figure 3F:
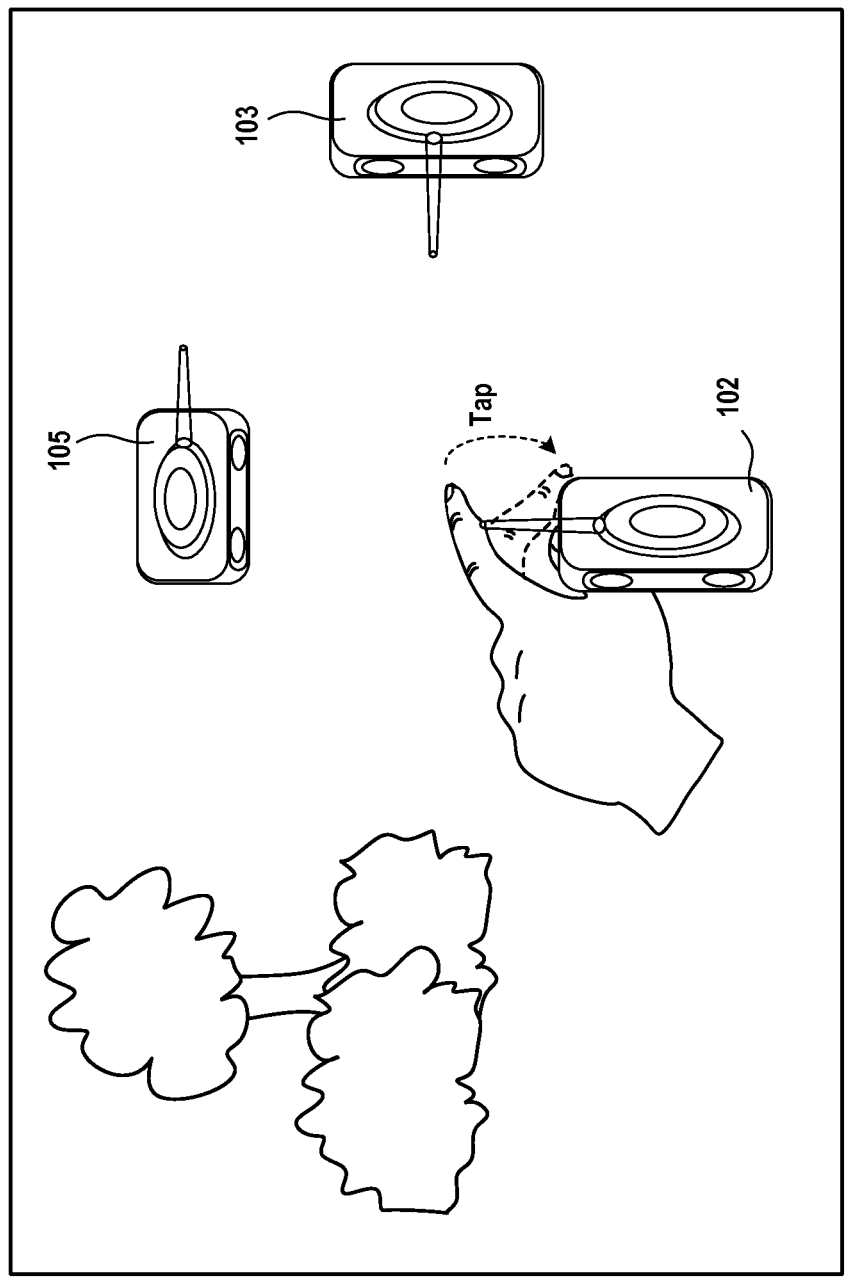
Figure 3H:
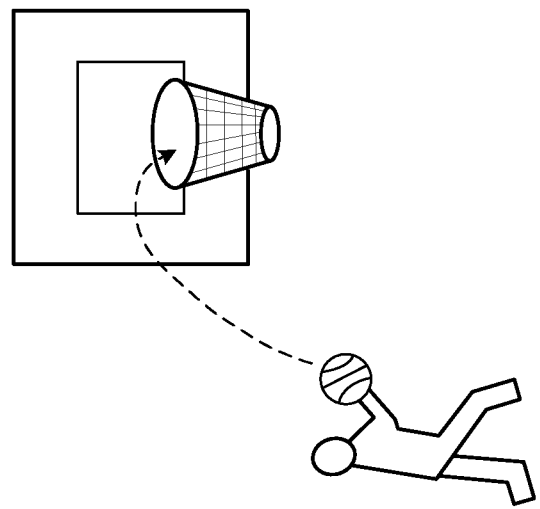
FIGS. 3G-3H illustrate exemplary control-screen of a display device used to render game scenes of different video games wherein the touch input controls the movement of different game objects, in accordance with some embodiments of the invention.
Figure 3G:
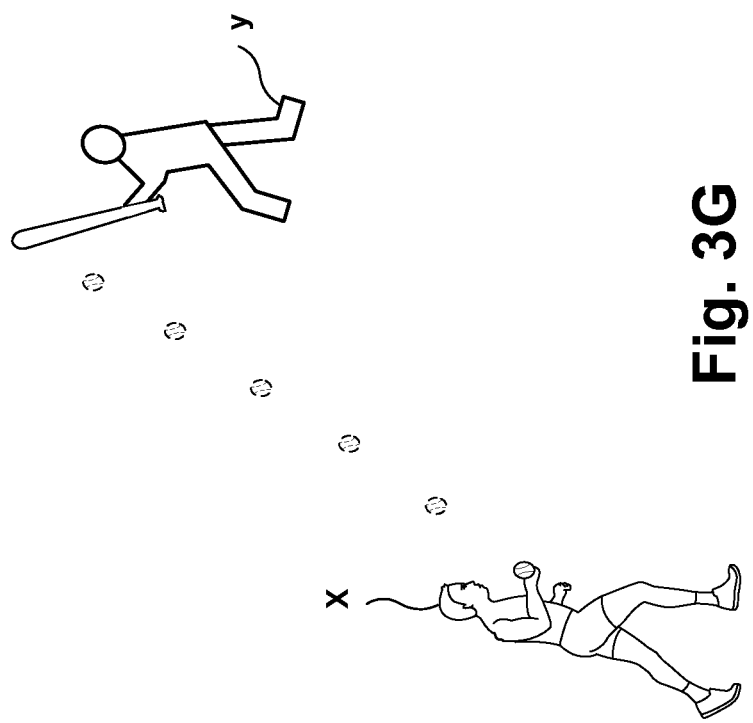

FIG. 3F illustrates another embodiment wherein the touch input is a tap gesture provided on the game object 102 of the user. In this embodiment, the tap gesture would result in manipulating the game object's state. For example, when the game object is moving, the tap gesture will result in manipulating the game object to stop. Subsequently, when a user provides a finger flick or finger swipe, the game object is manipulated to move forward in the direction provided by the user's finger flick/swipe.

In one embodiment, when a game object is moving in a particular direction and there is an obstacle or an indestructible object ahead in the path of the game object, a user may provide either a tap to stop the game object or a finger flick/swipe to change the direction of the game object away from the obstacle/indestructible object. Alternately, the game object may be manipulated to maneuver around the obstacle and continue to move in the direction defined by the touch input.

FIG. 3G illustrates another embodiment wherein the video game selected for game play is a baseball game. The game object may be a baseball and the touch input may be used to pitch the baseball from the pitcher, represented as user X, at the mound to the batter, represented as user Y. In this embodiment, the touch input may be a tap gesture directed at the user Y and, in response to the tap gesture, the baseball is thrown from user X (i.e., pitcher) toward the batter (i.e., batter). FIG. 3H illustrates yet another embodiment, wherein the video game selected for game play is a basketball game. The game object, in this embodiment, may be the basketball and the touch input may be used to throw the basketball from the player's hand toward the basket. In this embodiment, the touch input may be a movement gesture having a swipe profile. The movement gesture identifies the path the basketball is manipulated to take during game play, in response to the touch input. As can be evidenced, the game selected for game play can be any type of game and the game objects that are manipulated during game play, in response to the touch input, are appropriate for the selected game.

Referring back to FIG. 1, after interpreting the touch input and manipulating the game object in response to the touch input, subsequent touch inputs received at the control-screen during game play are used to refine the direction, location, and, optionally, the momentum of the game object. The refiner 212 within the object manipulator 210 identifies the subsequent touch inputs and manipulates the game object accordingly. For example, if a game object is moving in a forward direction in response to an initial touch input, a subsequent finger swipe in a different direction would cause the game object to cease movement in the first direction and change its course to the new direction defined by the finger swipe. Each subsequent finger swipe can have a different angle relative to directional angle in which the game object is currently moving and the directional course of the game object is adjusted to follow the new direction. The finger swipe may be a backward swipe, forward swipe, left or right directional swipe, etc., and the game object is manipulated to correlate with the direction defined by the finger swipe. In some embodiments, the momentum of the game object is manipulated based on the direction and movement gesture of the touch input. For example, in one embodiment, multiple flicks in the same direction may result in the game object being manipulated to move in the direction of the flicks at the same momentum. Alternately, each of the multiple flicks in the same direction may cause an increase in the momentum by a predefined factor while maintaining the game object in the same directional course.

When a backward swipe is received, the game object may be manipulated to move backwards in an angle defined by the backward swipe. After the game object is manipulated to start rolling backwards, a touch input in the form of tap gesture may be used to bring the game object to a stop. A subsequent forward flick in any particular direction will cause the game object to move forward in that direction.

The game play manipulator tool provides a simple, intuitive tool to manipulate game objects in a video game using a control-screen of a display device on a client device. The touch screen interface detects the various characteristics of the touch input and uses them to manipulate the game objects within the game, for a rich user experience. The user does not have to memorize the various complicated controls for the different games as the control-screen provides a simple and straight forward way of interacting with the video game during game play.

It is noted that the embodiments illustrated in FIG. 1 are exemplary. Other embodiments may utilize different modules, computer programs, interfaces, interactions, database structures, etc. The embodiments illustrated in FIG. 1 should therefore not be interpreted to be exclusive or limiting, but rather exemplary or illustrative.

Figure 4:
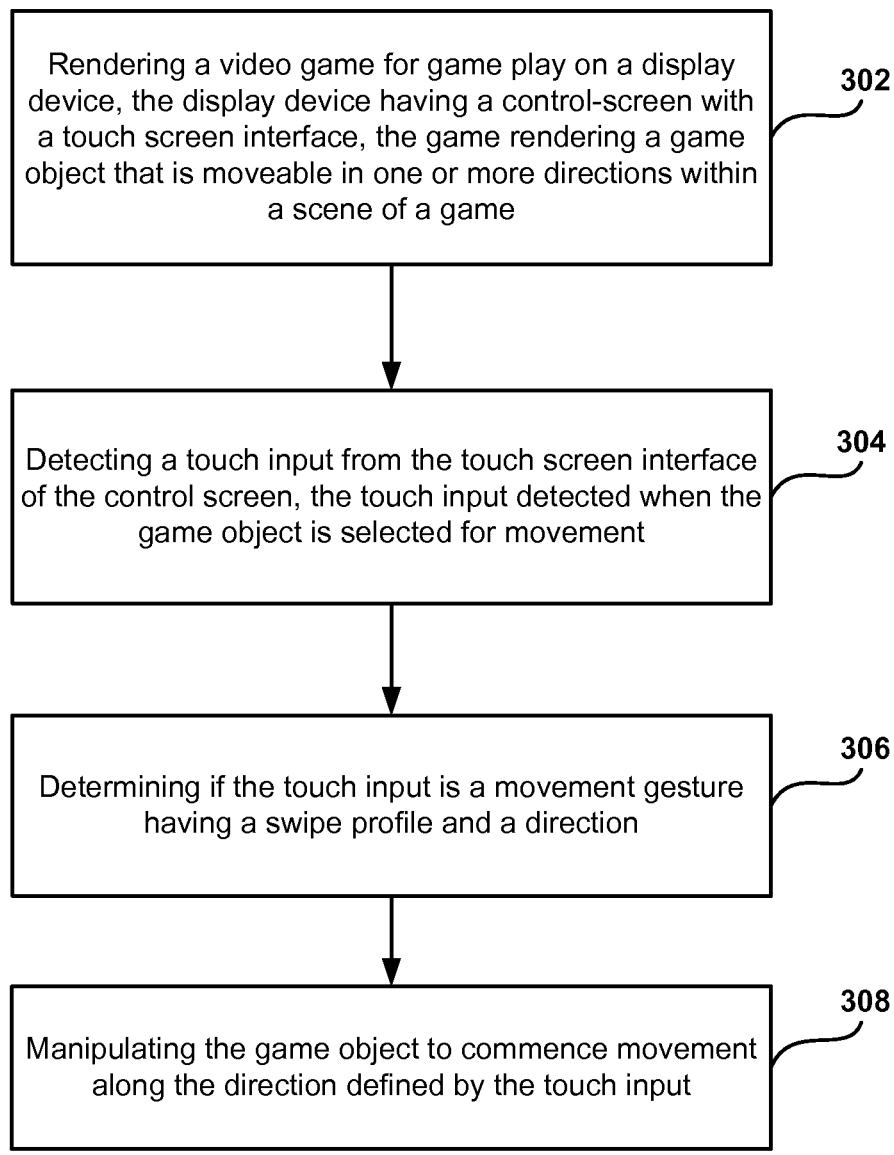
FIG. 4 illustrates a flow chart of various method operations involved in manipulating a game object during game play of a video game, according to one embodiment.

FIG. 4 is a flowchart illustrating method operations for handling a user input to a game executed on a device, in accordance with one embodiment. In operation 302, a video game is rendered on the device for game play, in response to a request from a user. The display device may be a glass display device having a control-screen with a touch screen interface. The video game selected for game play may be a multi-player game or a single player game.

Touch input is detected at the touch screen interface of the control screen, as illustrated in operation 304. The touch input may define different types of finger gestures including a tap gesture or a movement gesture. Depending on the type of finger gesture, one or more characteristics of the touch input are identified from the input profile, including a start location, an end location, and a direction. In one embodiment, a tap gesture is associated with location aspect and the movement gesture is associated with location and directional aspect.

In response to the detection of touch input, the input profile of the touch input is analyzed to identify the characteristics of the touch input, as illustrated in operation 306. In the case of touch input being a movement gesture, the input profile will include swipe characteristics (i.e., start location and end location) and a direction. In case of a tap gesture, the input profile will include tap characteristics (i.e., location).

Based on the analysis of the detected touch input, the game object of the video game is manipulated to correlate with the touch input, as illustrated in operation 308. The manipulation of the game object includes manipulating the state of the game object, the direction of movement of the game object within the game scene of the video game and/or interaction of the game object with other game objects. For example, the input characteristics of the touch input may result in manipulating the game object that is at rest to start moving in a direction defined by the touch input. In another example, the game object that is moving in a specific forward direction may continue to move in that direction based on the touch input characteristics or may change the direction to match the input characteristics. In yet another example, the game object that is moving in a specific direction may be manipulated to stop based on the touch input. The game object manipulation using the touch input on the control-device provides a more simplistic way of interacting with the video game. In some embodiments, in addition to manipulating the state, direction of movement and/or interaction with other game objects, the momentum of the game object may also be manipulated to correlate with the touch input provided at the touch screen.

Figure 5:
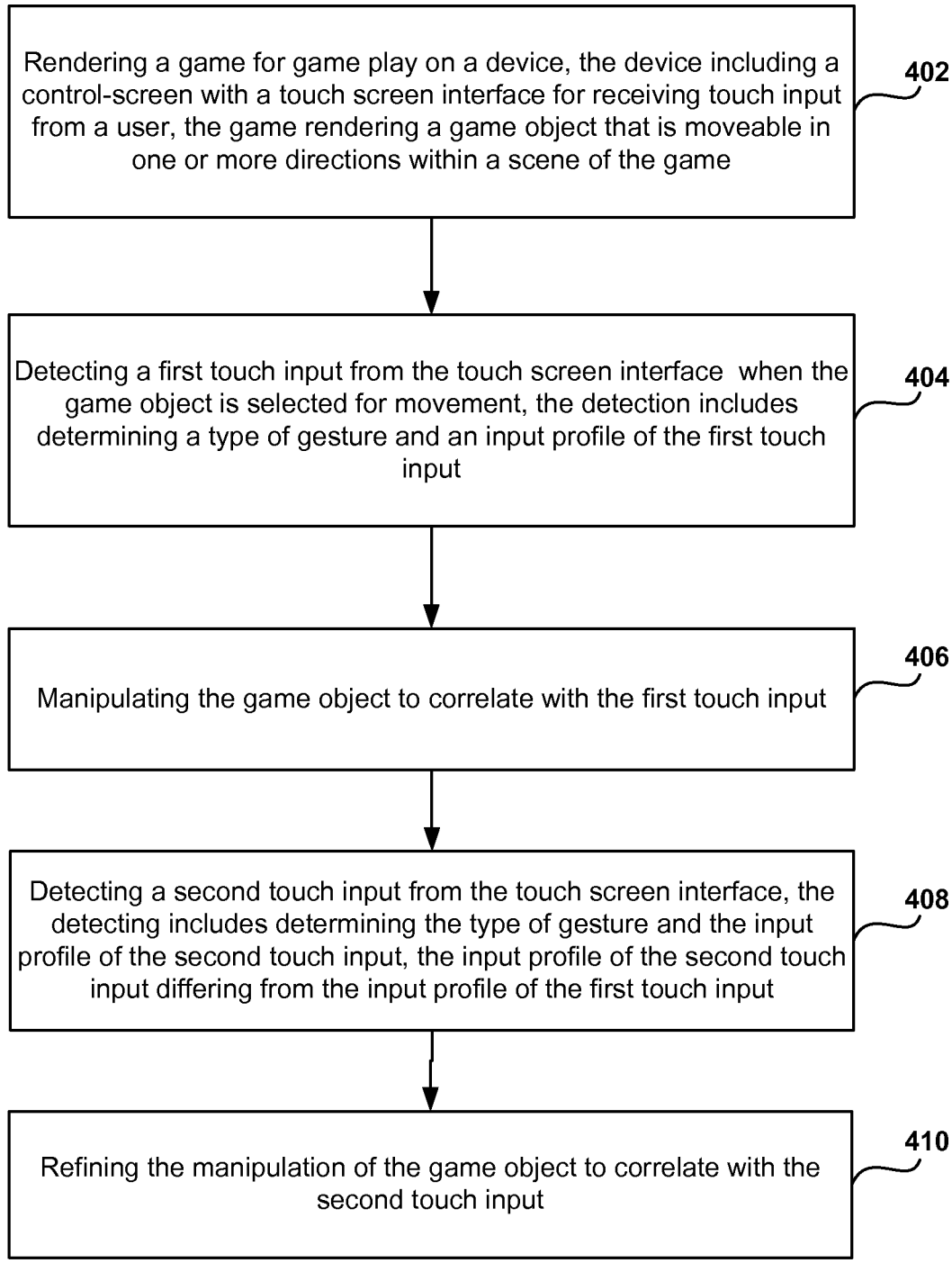
FIG. 5 illustrates a flow chart of various method operations involved in manipulating a game object during game play of a video game, in an alternate embodiment.

FIG. 5 illustrates an alternate embodiment for handling user input to a video game executed on a device, during game play. The method begins at operation 402 wherein a selected video game is rendered on a display device, in response to a request from a user. The display device includes a control-screen with a touch screen interface.

A first touch input is detected at the touch screen interface of the control-screen upon selection of a game object for movement within the game, as illustrated in operation 404. The touch input is received during game play of the video game. The first touch input is analyzed to determine type of gesture and to identify the input profile of the first touch input. The input profile identifies one or more of a first start location, first end location, and a first direction.

A game object is manipulated to correlate with the first touch input provided at the touch screen interface, as illustrated in operation 406. The manipulation based on the touch input may include moving the game object in the first direction defined by the first touch input when the game object is at rest, stopping the game object when it is moving, or maintaining/changing the directional course of the moving game object. In one embodiment, the momentum of the game object may also be manipulated based on the input profile of the first touch input. In one embodiment, the manipulation may include computing magnitude of displacement defined by the first touch input and moving the game object in accordance to the magnitude of displacement, upon determining the magnitude of displacement is above a predefined threshold value.

A second touch input is detected at the touch screen interface, as illustrated in operation 408. The detection of the second touch input includes determining type of gesture and input profile of the second touch input. The input profile of the second touch input is different from the input profile of the first touch input. In one embodiment, the input profile of the second touch input is different from the input profile of the first touch input with regards to the type of gesture or direction of movement. In response to the second touch input, the manipulation of the game object is refined to correlate with the second touch input, as illustrated in operation 410. The second touch input may include movement gesture defined by a finger swipe in a direction different from the direction defined in the first touch input and, in response, the game object may be manipulated to cease movement in the first direction and begin moving in the second direction. In one embodiment, the change in movement may be implemented upon ensuring that the magnitude of displacement is above a predefined threshold value. When the second touch input is a tap gesture, the location of the second touch input is determined. When the location of the second touch input is on the game object, the game object moving in the first direction may be manipulated to stop moving. When the location of the second touch input is on a second game object, the game object may be manipulated to interact with the second game object. When the second touch input includes a tap at a specific point of the game scene where there are no game objects, the user's game object may be manipulated to move to the specific point of the game scene. Thus, the various embodiments provide a tool with controls for a user to maneuver and control the game object of the video game during game play.

In one embodiment, operations of the method are performed by a computer program when executed by one or more processors, the computer program being embedded in a non-transitory computer-readable storage medium.

Figure 6:
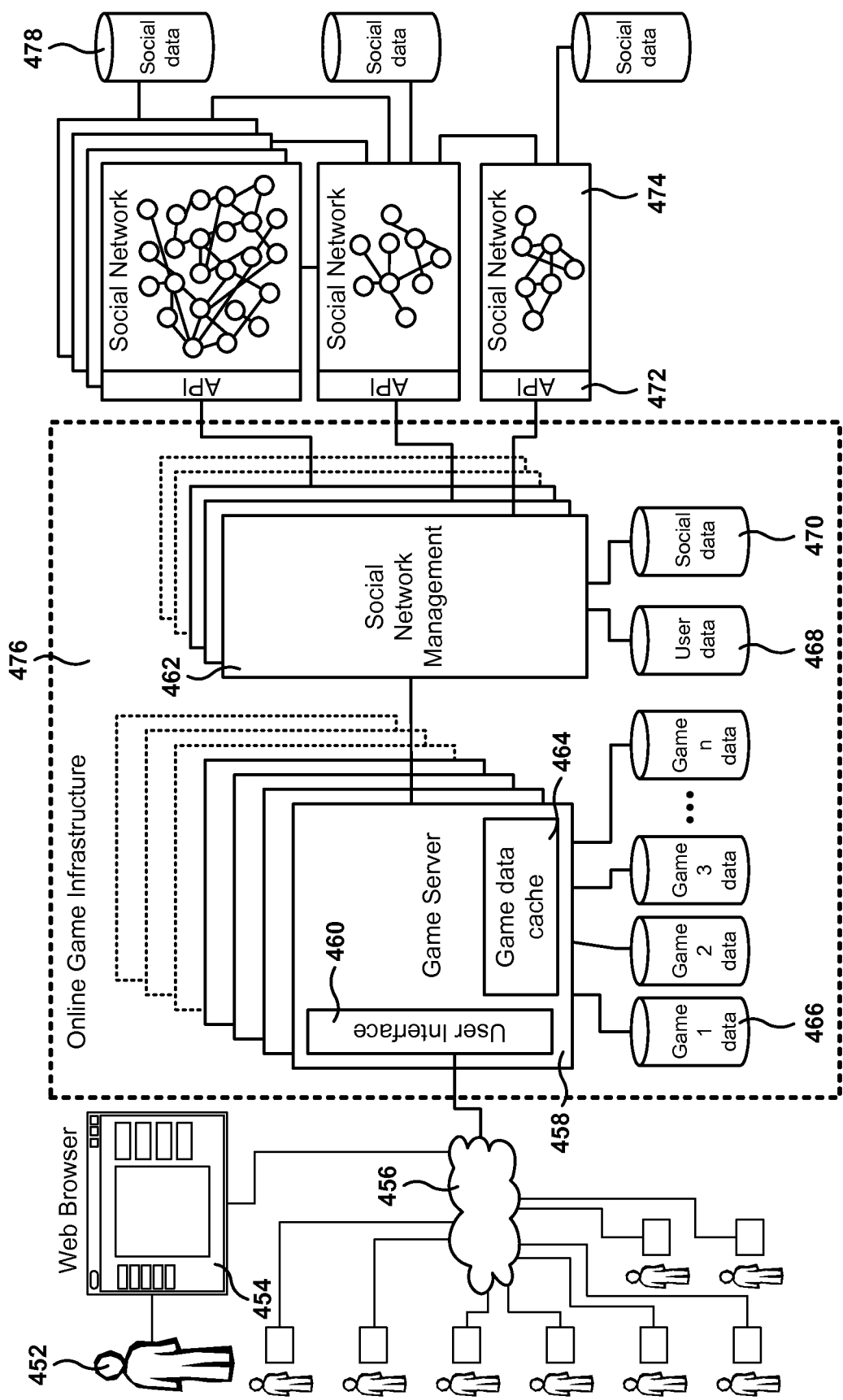
FIG. 6 illustrates an implementation of a Massively Multiplayer Online (MMO) infrastructure in which the video game may be played amongst a plurality of users, according to one embodiment.

FIG. 6 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games. Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 6 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 6 should therefore not be interpreted to be exclusive or limiting, but rather exemplary or illustrative.

Figure 7:
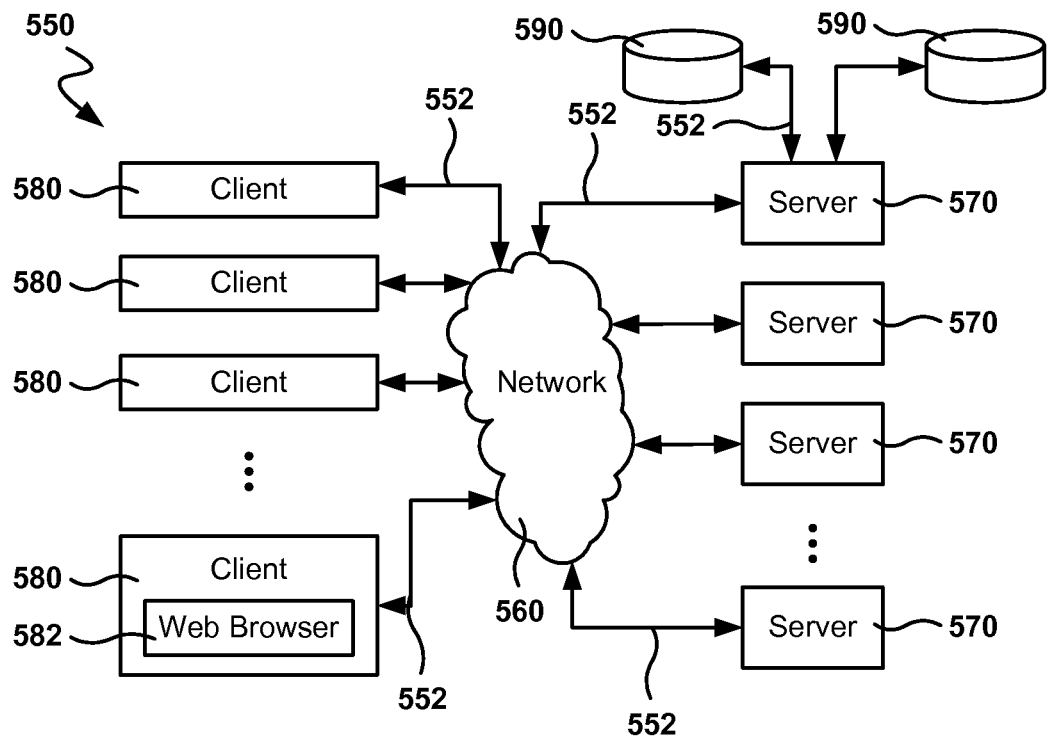
FIG. 7 illustrates an example network environment suitable for implementing embodiments.

FIG. 7 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, community server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 8:
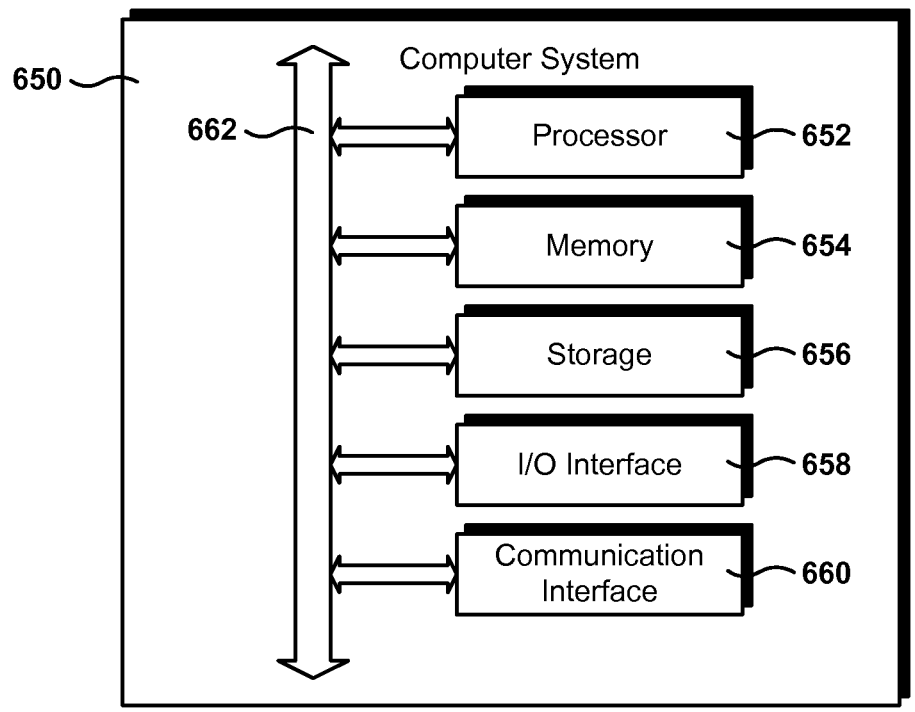
FIG. 8 illustrates an example computer system for implementing embodiments.

FIG. 8 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. § 101.

One or more embodiments can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method for handling a touch input to a game executed on a device, comprising:
    rendering the game on the device, the device having a touch screen for receiving touch input from a user, the game rendering a game object that is moveable in one or more directions within a scene of the game when rendered;
    detecting touch input on the touch screen for the game object, wherein the touch input is provided over the game object rendered at the touch screen to control actions of the game object;
    determining if the detected touch input is a movement gesture having a swipe profile and a direction;
    causing the game object to commence movement along the direction when the touch input is determined to be the movement gesture, wherein causing the game object to move further includes interpreting the touch input to determine a magnitude of displacement and moving the game object based on the magnitude of displacement determined from the touch input;
    detecting a second touch input on the touch screen while the game object is moving in the direction defined by the touch input;
    determining if the second touch input is one of the movement gesture having a second swipe profile and a second direction; and
    adjusting the movement of the game object in accordance to the second swipe profile and the second direction defined in the second touch input, when the second touch input is determined to be the movement gesture, wherein operations of the method are executed by a processor.

2. The method of claim 1, wherein the determining further includes identifying a start location and an end location of the touch input defined in the swipe profile, the start location and the end location used to compute a magnitude of displacement defined by the touch input.

3. The method of claim 2, wherein when the game object is resting, the touch input detected on the touch screen causes the game object to commence movement along the direction defined by the touch input, when the magnitude of displacement of the touch input is greater than or equal to a predefined threshold value.

4. The method of claim 2, wherein when the game object is moving along the direction defined by the touch input and the second touch input is a movement gesture in the second direction that is different from the direction of the touch input, the adjusting includes causing the game object to cease movement in the direction and commence movement in the second direction, when the magnitude of displacement of the second touch input is greater than or equal to a predefined threshold value.

5. The method of claim 4, wherein the direction is a forward direction and the second direction is a backward direction.

6. The method of claim 4, wherein the second direction differs from the direction by an angle that is greater than zero.

7. The method of claim 1, wherein when the game object is moving in the direction and the second touch input is a movement gesture along the direction, causing the game object to continue movement along the direction specified by the movement gesture and to increase a momentum of the game object in the direction by a predefined factor.

8. The method of claim 1, wherein causing the game object to move further includes adjusting the direction of movement of the game object to steer around an indestructible object and continue movement in the direction defined by the touch input, when the game object encounters the indestructible object in the direction of movement.

9. The method of claim 1, wherein when the detected second touch input is a tap gesture having a tap profile,
    determining a location of the tap gesture within the scene as defined in the tap profile; and adjusting one or more objects within the scene of the game based on the location of the tap gesture.

10. The method of claim 9, wherein when the location of the tap gesture is on the game object and the game object is moving along the direction, causing the game object to cease movement.

11. The method of claim 9, wherein when the location of the tap gesture is on a second game object, causing the game object to interact with the second game object in response to the tap gesture.

12. The method of claim 11, wherein the interaction includes directing the game object to fire a game missile at the second game object.

13. A method for handling a touch input to a game executed on a device, comprising:
rendering the game on the device, the device having a touch screen for receiving touch input from a user, the game rendering a game object that is moveable in one or more directions within a scene of the game, when rendered;
detecting a first touch input at the touch screen for the game object, wherein the first touch input is provided over the game object rendered at the touch screen, the detection includes determining a type of gesture and an input profile of the first touch input;
moving the game object in a first direction that correlates with the input profile of the first touch input, when it is determined that the type of gesture of the first touch input is a movement gesture, the moving of the game object includes computing a magnitude of displacement using information provided in the input profile and applying a momentum to the game object in the first direction based on the magnitude of displacement;
detecting a second touch input at the touch screen after the first touch input and while the game object is moving in the first direction, wherein the detection includes determining the type of gesture and input profile of the second touch input, the input profile of the second touch input differing from the input profile of the first touch input; and
adjusting the movement of the game object to correlate with the input profile of the second touch input, when it is determined that the type of gesture of the second touch input is a movement gesture, wherein the adjusting includes adjusting the momentum of the game object,
wherein operations of the method are executed by a processor.

14. The method of claim 13, wherein the type of gesture includes one of a movement gesture or a tap gesture and wherein the input profile includes one or more of a start location, an end location, and a direction.

15. The method of claim 13, wherein when the first touch input and the second touch input are movement gestures and a direction defined in the input profiles of the first touch input and the second touch input are different, the adjusting of the game object includes,
moving the game object along the first direction defined in the input profile of the first touch input upon determining that a magnitude of displacement defined by the first touch input is above a predefined threshold value; and
adjusting the movement of the game object includes,
causing the game object to cease movement in the first direction defined in the input profile of the first touch input and commence movement along the second direction defined in the input profile of the second touch input upon determining the magnitude of displacement defined by the second touch input is above the predefined threshold value,
wherein the commencement of movement along the second direction defined in the second touch input beginning at a start location defined by the second touch input.

16. The method of claim 13, wherein when the first touch input is a movement gesture and the second touch input is a tap gesture, the manipulating the game object includes,
moving the game object along the first direction defined in the input profile of the first touch input upon determining a magnitude of displacement defined by the first touch input is above a predefined threshold value;
determining a location defined in the input profile of the second touch input; and
when the location of the second touch input is at the location of the game object, the adjusting movement of the game object includes,
causing the game object to cease movement along the first direction defined by the first touch input.

17. The method of claim 16, wherein when the location of the second touch input is at the location of a second game object within a scene of the game, the adjusting movement further includes,
causing the game object to interact with the second game object.

18. The method of claim 17, wherein the interaction includes directing the game object to fire a game missile at the second game object.

19. A computer program embedded in a non-transitory computer-readable storage medium, when executed by one or more processors, for performing a method for handling a touch input to a game executed on a device, the computer program comprising:
program instructions for rendering the game on the device, the device having a touch screen for receiving touch input from a user, the game rendering a game object that is moveable in one or more directions within a scene of the game when rendered;
program instructions for detecting touch input on the touch screen for the game object wherein the touch input is provided over the game object rendered at the touch screen;
program instructions for determining if the detected touch input is a movement gesture having a swipe profile and a direction;
program instructions for causing the game object to commence movement along the direction when the touch input is determined to be the movement gesture, wherein the program instructions for causing the game object to move further includes program instructions to interpret the touch input to determine a magnitude of displacement and to cause the game object to move based on the magnitude of displacement;
program instructions for detecting a second touch input on the touch screen and while the game object is moving in the direction defined by the touch input;
program instructions for determining if the second touch input is the movement gesture having a second swipe profile and a second direction; and
program instructions for adjusting the movement of the game object in accordance to the second swipe profile and the second direction defined in the second touch input, when the second touch input is determined to be the movement gesture.

20. The computer program of claim 19, wherein when the second direction is different from the direction, program instructions for adjusting further includes causing the game object to cease movement in the direction and commence movement in the second direction upon determining a magnitude of displacement defined in the second touch input is above or equal to a predefined threshold value.

\* \* \* \* \*